Aug. 30, 1932.    B. A. CASE    1,874,240
ELECTRICAL CIRCUIT REGULATOR
Filed April 29, 1930
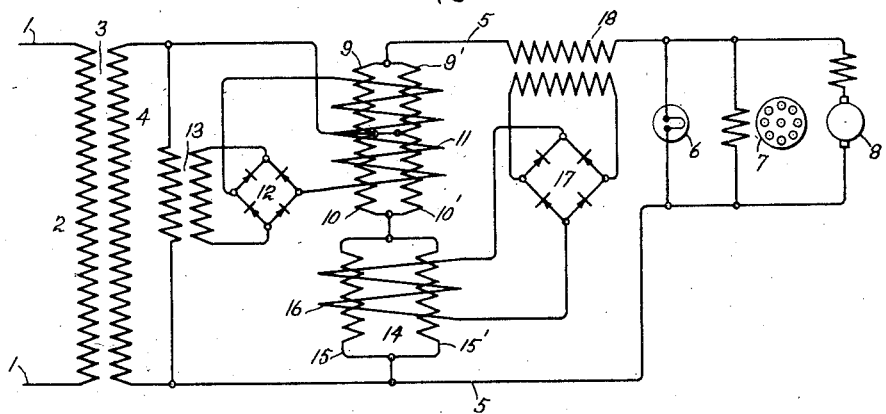
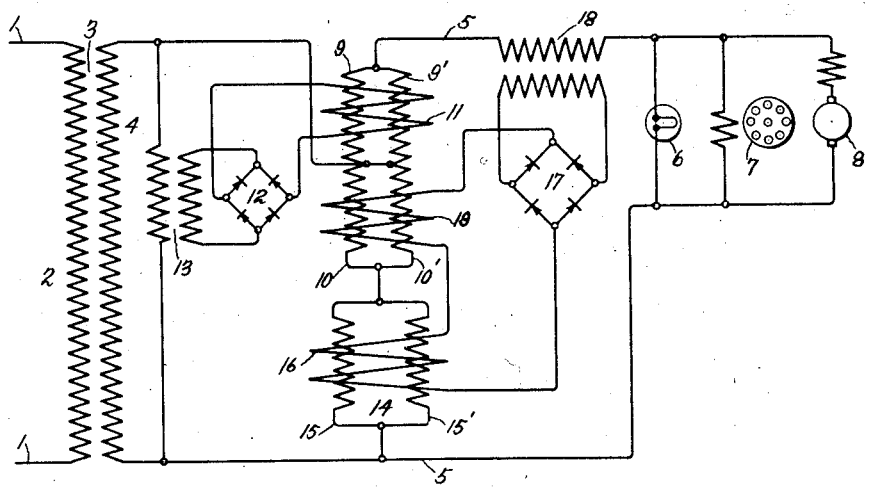
Inventor:
Byron A. Case,
by Charles E. Tullar
His Attorney.

Patented Aug. 30, 1932

1,874,240

UNITED STATES PATENT OFFICE

BYRON A. CASE, OF FORT WAYNE, INDIANA, ASSIGNOR TO GENERAL ELECTRIC COMPANY, A CORPORATION OF NEW YORK

ELECTRICAL CIRCUIT REGULATOR

Application filed April 29, 1930. Serial No. 448,397.

My invention relates to the regulation of an electrical condition of electric circuits or electrical machinery and particularly to improvements in static feeder voltage regulators.

Because of the obvious superiority of any regulating means which does not depend upon moving parts for its operation over regulating means which have moving parts, other things being equal, the problem of providing a thoroughly satisfactory static electric circuit, or feeder circuit, regulator has in the past received considerable attention. Static regulators of the type wherein a booster transformer is controlled by a saturable reactor are known in the art and it is the purpose of my invention to improve such regulators by providing means for increasing their range of operation.

An object of my invention is to provide an improved static regulator for electric circuits or electrical machinery.

Another object of my invention is to provide a novel means for increasing the range of operation of static regulators, for electric circuits or electrical machinery, which operate on the principle of magnetic saturation.

My invention will be better understood from the following description taken in connection with the accompanying drawing and its scope will be pointed out in the appended claims.

In the drawing, Fig. 1 is a diagrammatic representation of a specific embodiment of my invention as applied to the voltage regulation of an alternating current feeder circuit, while Fig. 2 shows a modification of the embodiment shown in Fig. 1.

Referring now to Fig. 1, 1 is an alternating current power supply circuit which is connected to the primary winding 2 of a step-down transformer 3 which secondary winding 4 is connected to a feeder circuit 5. Connected to be supplied with energy from circuit 5 are typical feeder circuit load devices such as a lamp 6, an induction motor 7, and an alternating current commutator motor 8. For supplying the necessary voltage boost to maintain constant voltage on circuit 5 over a wide range of load thereon is a booster transformer comprising a pair of series, or boosting, secondary windings 9 and 9' connected in circuit 5 and a pair of shunt primary windings 10 and 10' connected across circuit 5. An additional winding 11, which will be referred to as a saturating winding, is wound on the transformer and is energized through any suitable rectifying means, such as the full wave copper oxide rectifier 12 shown. Rectifier 12 is energized through a transformer 13 which is connected across circuit 5. This transformer is used merely for the purpose of reducing the voltage across saturating winding 11 and it will, of course, be obvious to those skilled in the art that it may be omitted if coil 11 is designed for the voltage of circuit 5. The windings 9 and 9' are wound in opposite directions with respect to coil 11 as also are the coils 10 and 10', it being understood that all of the transformer coils are wound on a common core member. The purpose of this arrangement is to prevent an unbalanced voltage being induced in the saturating coil and also to prevent the production of even harmonics by the transformer as it becomes saturated under the influence of coil 11. Connected in series with shunt coils 10 and 10' is a saturable reactor 14 comprising a pair of alternating current coils 15 and 15' and the saturating coil 16. The windings 15 and 15' are wound on a common core and in opposite directions with respect to saturating winding 16. The purpose of so winding coils 15 and 15' is the same as the purpose of dividing the transformer windings into oppositely wound coils. Saturating winding 16 may be connected to be energized in accordance with variations in any of the electrical conditions of circuit 5 and as shown is connected to be energized in accordance with variations in the current of circuit 5 by means of a current transformer 18 connected to it through any suitable rectifying means such as the full wave copper oxide rectifier 17 shown. Rectifier 17 might, of course, be connected directly in circuit 5 if desired, although as a practical matter it would not be desirable to have coil 16 carry such a large current as would result from such a connection.

The operation of the embodiment of my invention shown in Fig. 1 is as follows: Assume that power supply circuit 1 is connected to any suitable source of energy (not shown). If now changes in load occur on circuit 5 and if saturating winding 11 were not present the voltage drop across the shunt windings 10 and 10' would vary inversely with variations in the voltage drop across reactor 14, the variations in the latter voltage drop being caused by variations in the saturation of reactor 14 in response to variations in the current through circuit 5. The variation in the voltage drop across the shunt windings 10 and 10' will result in similar variations in the voltage boost induced in the series windings 9 and 9' due to the inductive relation of the shunt and series windings. Such an arrangement, with singles series and shunt windings on the booster transformer, is disclosed and claimed per se in an application of L. W. Thompson filed April 29, 1930, Serial No. 448,394, which application is assigned to the assignee of the present application.

Considering now the action of saturating winding 11. As this coil is in effect connected across circuit 5 its energization will remain substantially constant, the value of this energization being sufficient to partially saturate the core of the booster transformer. Thus at no load or very light loads the reactor 14 will be unsaturated, as coil 16 is carrying no appreciable current, whereas the booster transformer will be partially saturated which will mean that a greater proportion of the total voltage drop across reactor 14 and the shunt winding of the booster transformer will take place across the terminals of the reactor, or in other words, a lesser proportion of the total voltage drop will appear across the terminals of the shunt winding of the booster transformer than if the saturating winding 11 were not present thereby reducing the no load voltage boost of the booster transformer. It will thus be seen that the use of a substantially constantly energized saturating winding on the booster transformer extends the range of operation of the regulating means shown in Fig. 1 in that it reduces the no load and light load voltage boost of the booster transformer. Saturating winding 11 will also tend to compensate for changes in the voltage of circuit 1 for as this voltage increases the impedance of the booster transformer will decrease and the boost will decrease while as this voltage decreases the impedance of the booster transformer will increase thereby to increase its voltage boost.

The modification of my invention shown in Fig. 2 differs from that shown in Fig. 1 in that the booster transformer is provided with an additional saturating winding 19 whose energization varies in accordance with variations in one of the electrical conditions of circuit 5, which in the embodiment shown is the load current, the energization of this winding also being such that its magnetizing effect opposes the similar effect of the substantially constantly energized saturating winding 11. I have shown saturating winding 19 connected in series with the saturating winding 16 on reactor 14, although it will of course be obvious to those skilled in the art that these saturating windings might be connected in parallel with each other without departing from my invention in is broader aspects. The operation of the embodiment of my invention shown in Fig. 2 is the same as that of Fig. 1 at no load on circuit 5 and is substantially the same at light loads because under these conditions the current through coil 19 is negligible. However, as the load on circuit 5 increases the energization of saturating coil 19 increases at the same time that the current through saturating coil 16 on reactor 14 increases thereby to cause an increase in the reactance of the booster transformer at the same time that the reactance of saturable reactor 14 decreases, whereas in Fig. 1 an increase in the load will only cause a decrease in the reactance of reactor 14. As a result the maximum difference between the voltage drops across reactor 14 and the booster transformer in Fig. 2 will be considerably greater than the maximum difference between the voltage drops across the same elements in Fig. 1, with the result that the range of regulation of the embodiment of my invention shown in Fig. 2 will be greater than the range of regulation of the embodiment shown in Fig. 1.

While I have shown and described particular embodiments of my invention it will be obvious to those skilled in the art that changes and modifications may be made without departing from my invention and I, therefore, aim in the appended claims to cover all such changes and modifications as fall within the true scope of my invention.

What I claim as new and desire to secure by Letters Patent of the United States is:

1. In combination, an alternating current circuit, a booster transformer connected to said circuit, a saturable reactor connected to the primary winding of said transformer, means tending to produce a substantially constant predetermined degree of saturation of the magnetic circuit of said transformer, and means for varying the saturation of said reactor in accordance with variations in an electrical condition of said circuit.

2. In combination, an alternating current load circuit, a booster transformer having a series winding and a shunt winding connected to said circuit, a reactor connected in series with said shunt winding, means for producing a predetermined magnetic bias in the magnetic circuit of said transformer and means for varying the saturation of said reactor in proportion to variations in load on said circuit.

3. In a static electric circuit regulator, a booster transformer comprising a series boosting winding and a shunt winding, a reactor connected in series with the shunt winding of said booster transformer, means tending to produce a substantially constant predetermined degree of saturation of the magnetic circuit of said booster transformer, and means for varying the degree of saturation of the magnetic circuit of said reactor in proportion to variations in the current flow through said series winding.

4. In combination, an alternating current circuit, a booster transformer including a series winding connected in said circuit and a shunt winding connected across said circuit, a reactor connected in series with said shunt winding, a saturating winding on said transformer, means including a rectifier connecting said saturating winding to be responsive to the voltage of said alternating current circuit, a saturating winding on said reactor, and means including a rectifier connecting the reactor saturating winding to be responsive to the current in said alternating current circuit.

5. In combination, an alternating current circuit, a booster transformer including a saturating winding, a pair of series windings connected in parallel in said circuit, said series windings being wound in opposite directions with respect to said saturating winding and a pair of shunt windings connected in parallel across said circuit, said shunt windings being wound in opposite directions with respect to said saturating winding, a saturable reactor connected in series with said shunt windings, said reactor including a saturating winding and two windings which are wound in opposite directions with respect to said saturating winding, said last mentioned windings being connected in parallel with each other and in series with said shunt windings, means for maintaining a substantially constant direct current in the saturating winding of said transformer, and means for maintaining a direct current in the saturating winding of said reactor which varies in accordance with variations in the load on said circuit.

6. In a system of distribution, in combination an alternating current power supply circuit, a load circuit, a step-down transformer connecting said power supply circuit and said load circuit, a booster transformer connected to said load circuit, a saturable reactor connected so as to control the voltage drop across the primary winding of said booster transformer, means for providing a substantially constant magnetic bias in said transformer, and means for providing a saturating magnetic bias in said reactor which varies in accordance with variations in the current in said load circuit.

7. In combination, an alternating current circuit, a booster transformer connected to said circuit, a saturable reactor connected to said transformer in a manner to control the voltage boost thereof, means for producing a substantially constant magnetic bias in said transformer, and means for producing a magnetic bias in said transformer and reactor which varies in accordance with variations in an electrical condition of said circuit, the variable magnetic bias produced in said transformer being opposed to said substantially constant bias.

8. In combination, an alternating current circuit, a booster transformer including a series winding connected in said circuit and a shunt winding connected across said circuit, a saturable reactor connected in series with said shut winding, means including a saturating winding tending to produce a substantially constant degree of saturation in said transformer, and means including saturating windings on said transformer and reactor for oppositely varying the degree of saturation of said transformer and reactor in accordance with variations in the electrical condition of said circuit.

9. In combination, an alternating current circuit, a booster transformer including a saturating winding, a pair of series windings connected in parallel in said circuit, said series windings being wound in opposite directions with respect to said saturating winding and a pair of shunt windings connected in parallel across said circuit, said shunt windings being wound in opposite directions with respect to said saturating winding, a saturable reactor connected in series with said shunt windings, said reactor including a saturating winding and two windings which are wound in opposite directions with respect to said saturating winding, said last mentioned windings being connected in parallel with each other and in series with said shunt windings, means for maintaining a substantially constant direct current in the saturating winding on said transformer, means for maintaining a direct current in the saturating winding of said reactor which varies in accordance with variations in the load on said circuit, and a second saturating winding on said transformer connected to be energized by said last means in such a manner as to oppose the action of the first mentioned winding on said transformer.

10. In a system of distribution, in combination, an alternating current power supply circuit, a load circuit, a step-down transformer connecting said circuits, a booster transformer including a series winding connected in said load circuit and a shunt winding connected across said load circuit, a reactor connected in series with said shunt winding, a saturating winding on said reactor, a pair of saturating windings on said transformer, means including a rectifier connecting one of the saturating windings on said transformer across said load circuit, means including a rectifier for energizing the two remaining saturating windings in accordance with the current in said load circuit, the energization of the two saturating windings on said transformer being such that the magnetic effects produced by these windings are in opposition.

11. In combination, an electric circuit including in series a pair of reactance devices, means for producing a regulating quantity which varies in proportion to the voltage drop across one of said devices, means for varying the reactance of said other device, and means tending to maintain the reactance of said first device at a minimum value.

12. In combination, an electric circuit including a pair of reactance devices connected in series, means for producing a regulating voltage which is proportional to the voltage drop across one of said devices, means tending to maintain the reactance of said device at a minimum value, and means for simultaneously oppositely varying the reactances of said devices for regulating purposes.

In witness whereof, I have hereunto set my hand this 23d day of April, 1930.

BYRON A. CASE.